June 23, 1970  KENJI YODA ET AL  3,517,266
INTERFRAME SIDE-MOUNTED DISTRIBUTION PANELBOARD
Filed Aug. 27, 1968  2 Sheets-Sheet 2

INVENTORS
Kenji Yoda
Saburo Nagai
BY Marn & Jangarathis
ATTORNEYS

United States Patent Office 3,517,266
Patented June 23, 1970

3,517,266
INTERFRAME SIDE-MOUNTED DISTRIBUTION PANELBOARD
Kenji Yoda and Saburo Nagai, Tokyo, Japan, assignor to Nippon Electric Company, Limited, Tokyo, Japan
Filed Aug. 27, 1968, Ser. No. 755,613
Claims priority, application Japan, Sept. 7, 1967, 42/76,816
Int. Cl. H02b 1/04
U.S. Cl. 317—99                         8 Claims

ABSTRACT OF THE DISCLOSURE

An assembly of communication units including a framework mounted on a floor, pluralities of housings containing communication units and disposed in horizontal alignment on opposite sides of the framework in back-to-back relation to provide a space therebetween, and panelboards removably mounted in the space between corresponding housing ends at one end of the framework and embodying electric terminals for interconnecting the communication units and cables positioned in floor conduit for transmitting communication information and power.

---

This invention relates to an assembly of communication units, and more specifically to such assembly adapted for floor mounting and embodying removable communication distribution panelboards to permit expeditiously the addition of other communication units in future expansion.

Communication distribution panelboards utilized heretofore in main terminals, intermediate terminals, intermediate repeaters and similar stations in microwave, ultra-high frequency and other communication systems have been either a wall-mounted type, or a wall-embedded type or a free-standing type. In most such stations, the distribution panelboards were installed at locations separated from the principal communication equipment because of the particular designs of the panelboard supporting structures necessitated the availability of adequate space to accommodate additional communication units, as well as cable racks, cable conduit and auxiliary wiring devices, for present use and future expansion. In addition, prior art panelboard structures involved high on-the-job, factory and conduit installation costs which were found to be critical in the competitive field of manufacturing and installing microwave, ultra-high frequency and similar communication systems, particularly in the case of the installation of such communication facilities overseas.

The present invention contemplates a communication unit assembly embodying both communication units and panelboards and simplified in structure to permit expeditious and economical installation in high frequency signaling systems at any geographical location.

A principal object of the invention is to provide a facile assembly of communication equipments and panelboards in a high frequency signaling system.

Another object is to simplify a unitary assembly of communication equipment and panelboards therefor in a high frequency signaling system.

An additional object is to improve the economy of operating high frequency signaling systems.

A further object is to reduce the installation costs of high frequency signaling systems.

Still another object is to minimize the amount of station space required for the installation of communication units and panelboards in a high frequency signaling system.

Still an additional object is to provide a unitary assembly of both communication units and panelboards usable at one location in a high frequency signaling system.

A still further object is to miniaturize a unitary assembly of transistorized communication units and panelboards therefor in a high frequency signaling system.

Another object is to reduce the bulk of an assembly embodying communication units and panelboards in a high frequency signaling system.

An additional object is to reduce the cost of maintenance by enabling the performance of all maintenance operations at one geographical location.

A specific embodiment of the present invention comprises a framework positioned on a floor in a location accessible to a cable included in a conduit embedded in the floor for transmitting communication information and power, a first plurality of discrete housings containing communication units aligned in one plane on one side of the framework, a second plurality of discrete housings containing communication units aligned in one plane on another side of the framework whereby the first and second pluralities of housings are disposed in back-to-back relation to provide a space therebetween, panelboards removably mounted in a vertical array in the space between corresponding ends of the housings at one end of the framework and including electric terminals for interconnecting the floor cable and unit equipment, and covers for enclosing the panelboard terminals.

A plurality of bars, each secured to one pair of back-to-back housings, serve to retain the latter housing in position. An opening in the floor renders a preselected segment of the cable, usually the cable end, accessible to the panelboard terminals. An aperture formed in the uppermost end of each housing permits electrical connections from the units therein to the panelboard terminals. The retaining bars are also serviceable as cable racks for supporting the electric leads extending between the communication units and the panelboard terminals. For this purpose, the uppermost end of member 25 is disposed slightly below the uppermost end surfaces of the housings for securing the electric connections below the undersurfaces of the bars 19 to obviate damage to the latter connections.

A feature of the invention is that the panelboard support is removably mounted on one pair of back-to-back communication unit housings in a unitary assembly thereby obviating the complexities of ceiling and wall-mounted structures. This unitary assembly is easily capable of withstanding the forces resulting from earthquakes in those areas subject to such forces. Another feature is that the unitary assembly eliminates the need for cable racks, minimizes the need for conduit and signaling cables, and auxiliary wiring devices. A further feature is that maintenance techniques may be performed at one located thereby reducing the number and cost of personnel. An additional feature is that the reduced bulk of the unitary assembly of the communication units and panelboards reduces the space requirements therefor. Another feature is that a use of transistorized communication units perimts a simple structure of reduced weight. A further feature is that the simplified unitary assembly enables the experditious addition of other units in future expansion. Another feature is that the communication units and panelboards may be assembled at the factory and shipped to the installation site as a single unit.

The invention is readily understood from the following description taken together with the accompanying drawing in which.

Figure 1:
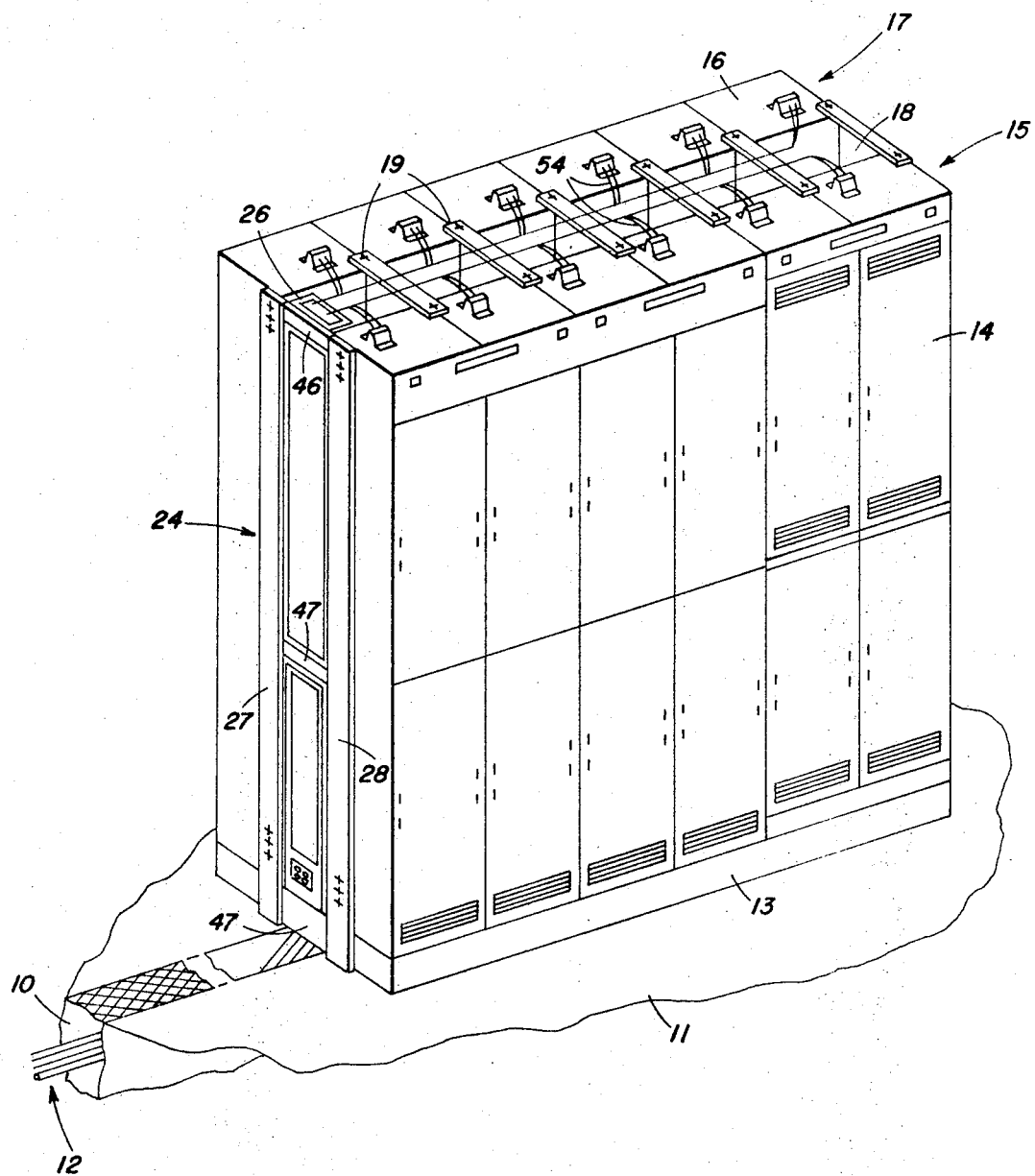
FIG. 1 is a perspective view of a unitary assembly of communication units and panelboards including covers in accordance with a specific embodiment of the invention.

FIG. 1 shows conduit 10 embedded in floor 11 and including a plurality of electric cables 12 transmitting communication information and power. A base framework 13 is positioned on the floor above an opening, not shown, provided therein and connected to the conduit to enable easy access to the cables included therein for a purpose that is later mentioned. A first plurality of discrete housings 14, each containing a transistorized communication unit, not shown, of well-known design includes the housings mounted side-by-side in horizontal alignment in a plane normal to a plane of the base framework on one side thereof as indicated by arrow 15.

A second plurality of discrete housings 16, each containing a transistorized communication unit not shown, of conventional design embodies the latter housings disposed side-by-side in horizontal alignment in a plane normal to the plane of the base framework and spaced from the plane of the first plurality of housings in parallel relation with the latter plane, as illustrated by arrow 17. It is seen in FIG. 1 that the first and second pluralities of housings are disposed in back-to-back relation, each housing of one plurality being in back-to-back relation with one housing of the other plurality to provide a space 18 therebetween. A plurality of suitable bars 19, each having one end secured to the uppermost end of one of each two housings disposed in back-to-back relation, maintains the housings in the first and second pluralities thereof in the back-to-back relation mentioned above.

FIG. 1 also shows panelboard arrangement 24 disposed in the space between the first and second pluralities of housings at one end of the base framework in a manner and for a purpose that are presently explained. FIGS. 1 through 7 show an elongated member 25 formed with a central channel 26 extending the entire axial length thereof and having integral flanges 27 and 28 on opposite upper edges thereof and disposed in space 18 between the first and second pluralities of housings at corresponding ends thereof at one end of the base framework in a plane normal to the plane of the latter framework and transverse to the planes of the first and second pluralities of housings to present the open end of said channel in a direction facing away from or opposite to the latter space. The flanges are positioned adjacent to the sides of the two back-to-back housings at the one end of base framework for suitable attachment to the latter sides to hold the member in the position just mentioned. It is noted in FIG. 1 that the uppermost end of the channel lies slightly below the uppermost end surfaces of the back-to-back housings for a purpose that is later mentioned.

Figure 7:
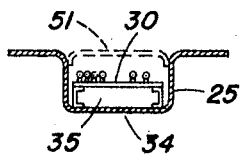
FIG. 7 is a cross-sectional view taken along line 7—7 in FIG. 4.

Panelboards 30, 31, 32 and 33 are positioned in a vertical array in one plane in the channel and are suitably secured to an inner surface of channel bottom 34 with sufficient space 35 between the inner surfaces of the respective panelboards and channel bottom as shown in FIG. 7 to permit electric leads to pass expeditiously therein for a purpose that is subsequently indicated. It is understood that suitable electric insulation is provided between the respective panelboards and the bottom 34 of supporting member 25. Panelboard 30 is supplied with alternating or direct terminals 36 as required. Panelboard 31 is provided with alternating or direct current plug-in outlet terminals 37 for appropriate instruments to enable testing and maintenance operations.

Figure 6:
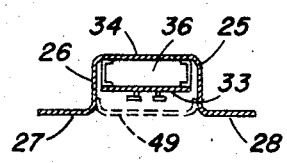
FIG. 6 is a cross-sectional view taken along line 6—6 in FIG. 4.

Panelboard 32 includes a vertical array of suitable power fuses 38 and a push-button switch 39 for controlling the on and off states of power at outlets 37, which latter states are noted by the illumination or non-illumination of indicating lamp 40 in the usual manner. Spare fuses 41 are available at a point above the push-button switch if so desired. Panelboard 33 contains a plurality of terminals 42 for power and communication information transmission as necessary. Electric connections to terminals 42 are preferably provided in the space 36 provided in the back of panelboard 33 as indicated in FIG. 6. It is understood that if and when alternating current power is made available at power outlets 37, suitable electric shielding, not shown, is so utilized thereabout as to preclude the occurrence of inductive effects upon the direct current components of the respective panelboards.

Figure 2:
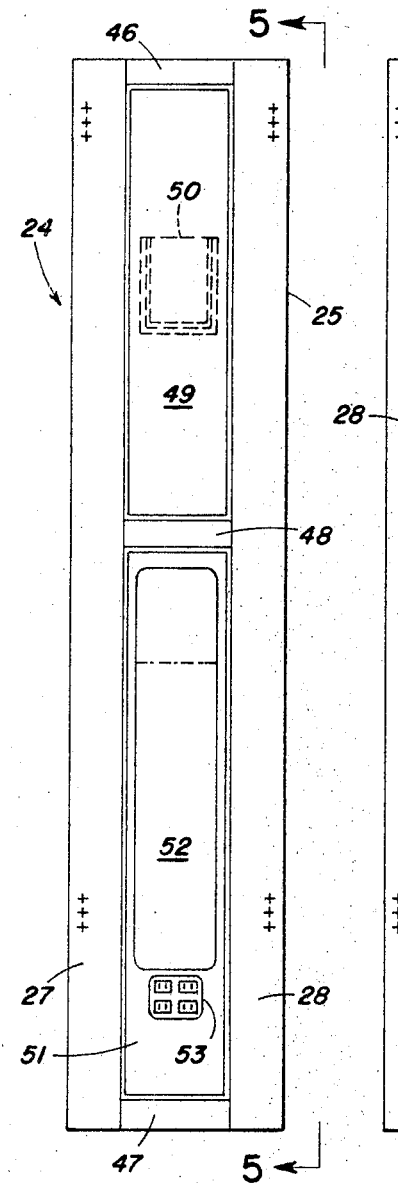
FIG. 2 is a front view of a panelboard assembly as seen in FIG. 1.
Figure 3:
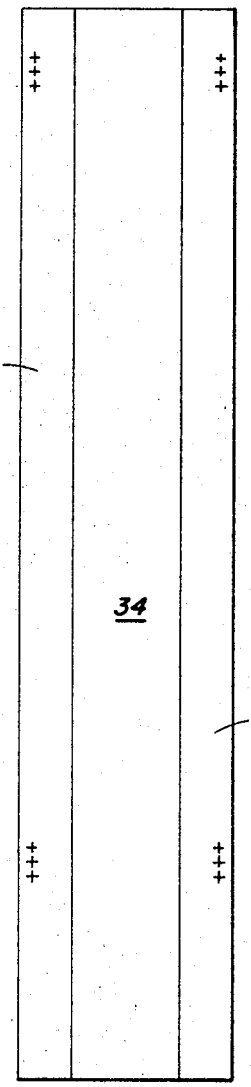
FIG. 3 is a rear view of the panelboard assembly in FIG. 2.
Figure 4:
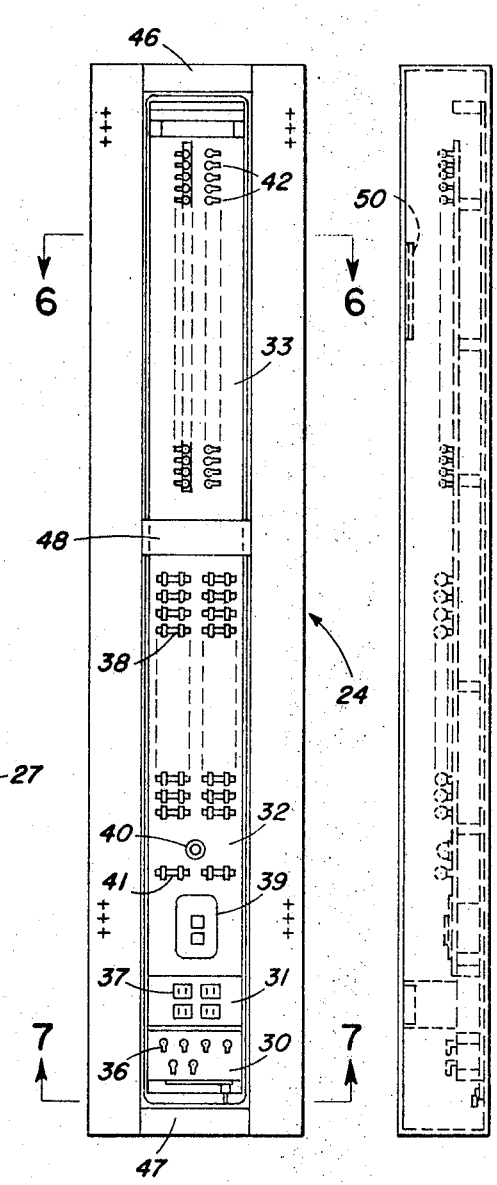
FIG. 4 is a front view of the unitary assembly of FIG. 2 with the covers removed.
Figure 5:
FIG. 5 is a side elevational view taken along line 5—5 in FIG. 2.

Separators 46 and 47 are fixedly positioned at the top and bottom, respectively, of the panelboard arrangement as shown in FIGS. 1, 2 and 4. An intermediate separator 48 is fixedly disposed between panelboards 32 and 33 as delineated in FIGS. 1, 2 and 4. A suitable upper cover 49 of preferably opaque material is removably located between fixed partitions 46 and 48 to permit inspection and adjustment of electric connections to terminals 42 as required. A pocket 50 is attached to the rear side of cover 49 to store wiring diagrams and the like for ready reference as desired. A lower cover 51 removably positioned between fixed partitions 47 and 48 includes a transparent window 52 to enable visual inspection of fuses 38, push-button switch 39 and pilot lamp 40 at all times while the latter cover is positioned in the manner just mentioned. Also, lower cover 51 embodies a suitable opening 53 to render plug-in terminals 37 accessible at all times without disturbing the in-place position of the latter cover.

It is thus seen in FIGS. 1 through 7 that the aforedescribed and respective panelboards serve to interconnect the power and communication cables in the floor conduit to the transistorized communication units contained in the several housings. For this purpose, it is obvious that electric connections 54, FIG. 1, extending from the panelboards to the communication unit housings may be suitably secured to the undersurface of bars 19 which thereby serve the additional function of cable racks in the manner well known in the art.

It is evident from the foregoing explanation that panelboard arrangement 24 may be expeditiously embodied without modification in any communication system according to the number of housings containing communication units required at a given time. It is apparent that the panelboards per se may be varied in length to accommodate desired numbers of fuses, terminals and the like as is necessary for present use and future expansion in any given high frequency communication system. In accordance with this invention, it is contemplated that the respective panelboards may be expeditiously wired at the factory at an economical cost and thereafter shipped to the communication unit site in suitable condition for installation except for the attachment of the electric connections to the proper communication units in the several housings. It is possible in some installations that the communication units and panelboard assembly be put together at the factory and shipped as a single unit to the installation site. These variations of manufacture permit further reductions of the installation cost.

It is understood that the invention herein is described in specific respects for the purpose of this description. It is further understood that such respects are merely illustrative of the application of the invention. Numerous other arrangements may be devised by those skilled in the art without departing from the spirit and scope of the invention.

What is claimed is:

1. A unitary assembly of microwave panelboards and communication units, comprising:
   a framework mounted in one plane;
   a first plurality of aligned discrete housings containing some of said units and mounted in side-by-side relation on one side of said framework in a second plane normal to said one plane;

a second plurality of aligned discrete housings containing others of said units and mounted in side-by-said relation on another side of said framework in a third plane normal to said one plane and spaced from said second plane in parallel relation therewith, said first and second pluralities of housings being so disposed in back-to-back relation as to provide a space therebetween;

cable means for providing electric power and electrical information signals;

and panelboard means mounted in said space at corresponding ends of said first and second pluralities of housings at one end of said framework; said panelboard means containing a plurality of panelboards which form a fourth plane normal to said one plane and transverse to said second and third planes; and said panelboard means including electric terminals connected to said units and said cable means.

2. The assembly according to claim 1 in which said panelboard means includes cover means for said terminals.

3. The assembly according to claim 1 in which said cable means comprises at least one cable mounted in said one plane in parallel relation with said framework and having one segment accessible to said panelboard means terminals.

4. The assembly according to claim 1 which includes a plurality of bars, each secured to uppermost ends of each two housings disposed in back-to-back relation.

5. The assembly according to claim 1 in which said panelboard means comprises a plurality of discrete panelboard elements arranged in a vertical array and consisting of a first panelboard element including communication terminals, a second panelboard element embodying fuse terminals, a third panelboard element having testing terminals, and a fourth panelboard element containing power outlet terminals.

6. The assembly according to claim 1 in which each of said housings embodies an aperture formed in an uppermost end thereof for enabling therethrough said interconnection of said panelboard means terminals and said units.

7. The assembly according to claim 1 in which said panelboard means comprises:

an elongated member formed with a channel extending along the entire axial length thereof and having flanges on opposite sides thereof, said member mounted in said fourth plane to dispose said channel in said space to present the open end of said channel in a direction parallel with said fourth plane and said flanges adjacent to sides of said housings at said corresponding ends thereof for removable attachment of said member to said last-mentioned sides;

a vertical array of discrete panelboard elements positioned in said channel and including said terminals;

and cover means detachably mounted on said members for covering said open end of said channel to enclose said panelboard elements and terminals.

8. A unitary assembly of microwave panelboards and communication units, comprising:

a cable conduit embodied in a floor and including therein cable transmitting communication information and electric power, said floor having an opening for exposing a preselected segment of said cable;

a framework positioned in one plane on said floor adjacent to said opening therein;

a first plurality of discrete housings containing some of said units and mounted in side-by-side alignment on one side of said framework such that the back walls of said housings form a second plane normal to said one plane;

a second plurality of discrete housings containing others of said units and mounted in side-by-side alignment on another side of said framework such that the back walls of these housings form a third plane normal to said one plane and spaced from said second plane in parallel relation therewith; said first and second pluralities of housings being so disposed in back-to-back relation as to provide a space therebetween and each uppermost end of each of said housings formed with an aperture therein;

a plurality of bars, each secured to uppermost ends of each two housings disposed in back-to-back relation;

and panelboard means constituting said panelboards and disposed in said space at corresponding ends of said first second pluralities of said back-to-back housings at one end of said framework, including:

an elongated member formed with a channel extending along the entire axial length thereof and having integral flanges on opposite sides thereof, said member disposed in said space to present the open side of said channel in a direction facing opposite to said space in a fourth plane normal to said one plane and transverse to said second and third planes and to locate said flanges adjacent to sides of two of said back-to-back housings at said corresponding ends of said first and second pluralities of housings for attachment to said last-mentioned sides;

a plurality of discrete panelboard elements positioned in a vertical array in said channel and including electric terminals of which some terminals are connected through said floor opening to said cable in said conduit, other terminals are connected through said housing apertures to said units in said housings, and additional terminals are available for power and testing;

and cover means detachably mounted on said member for enclosing said panelboard elements and terminals, said cover means including a further opening for exposing said additional power terminals for local use.

References Cited

UNITED STATES PATENTS

| | | | |
|---|---|---|---|
| 1,321,486 | 11/1919 | Starrett | 317—117 |
| 2,041,112 | 5/1936 | Bucher | 317—99 |
| 2,495,339 | 1/1950 | Markowitz | 317—99 X |
| 2,614,157 | 10/1952 | Montgomery | 317—99 X |
| 3,150,288 | 9/1964 | Flanders | 317—101 |
| 3,309,577 | 3/1967 | Roll | 317—99 |

LARAMIE F. ASKIN, Primary Examiner

G. P. TOLIN, Assistant Examiner

U.S. Cl. X.R.

317—101, 119